United States Patent [19]

Benoit et al.

[11] Patent Number: 4,464,157
[45] Date of Patent: Aug. 7, 1984

[54] METHOD OF PREPARING A THERMOPLASTIC BAG HAVING REINFORCED HANDLES

[75] Inventors: Gordon L. Benoit, Macedon; Jack J. Donaldson, Fairport; Paul D. Heilman, Williamson, all of N.Y.

[73] Assignee: Mobil Oil Corporation, New York, N.Y.

[21] Appl. No.: 569,925

[22] Filed: Jan. 11, 1984

Related U.S. Application Data

[60] Continuation of Ser. No. 308,759, Oct. 5, 1981, abandoned, which is a division of Ser. No. 086,374, Oct. 18, 1979, which is a continuation of Ser. No. 945,765, Sep. 25, 1978, abandoned.

[51] Int. Cl.³ .................. B31B 23/00; B31B 1/86
[52] U.S. Cl. .................................. 493/211; 493/224; 493/226; 493/926
[58] Field of Search ............... 493/211, 226, 926, 224, 493/339, 338, 193–197, 217, 933; 229/54 R

[56] References Cited

U.S. PATENT DOCUMENTS

| | | | |
|---|---|---|---|
| 3,154,238 | 12/1961 | Barnhill | 229/55 |
| 3,454,441 | 7/1969 | Spruyt | 229/54 R X |
| 3,468,470 | 9/1969 | Sengewald | 229/54 R |
| 3,482,761 | 1/1968 | Suominen | 229/54 |
| 3,548,723 | 12/1970 | Sengewald | 229/54 R X |
| 3,593,622 | 7/1971 | Sengewald | 493/226 X |
| 4,165,832 | 8/1979 | Kuklies et al. | 229/54 R |
| 4,340,379 | 7/1982 | Williamson | 493/211 |
| 4,346,834 | 8/1982 | Mazumdar | 229/54 R |

Primary Examiner—James F. Coan
Attorney, Agent, or Firm—Alexander J. McKillop; Michael G. Gilman; James P. O'Sullivan, Sr.

[57] ABSTRACT

The present invention relates to thermoplastic bag structures which are characterized by having a pair of carrying handles formed integrally with the bag walls and extending upwardly from opposite sides of the open mouth portion of the bag. Specifically, such handled bags are particularly characterized in having reinforced handle members where the handles comprise at least two layers of thermoplastic material, one of the layers imparting tensile strength to the individual layer and the other layer particularly employed to provide the requisite puncture and tear resistance necessary in such a bag structure.

9 Claims, 11 Drawing Figures

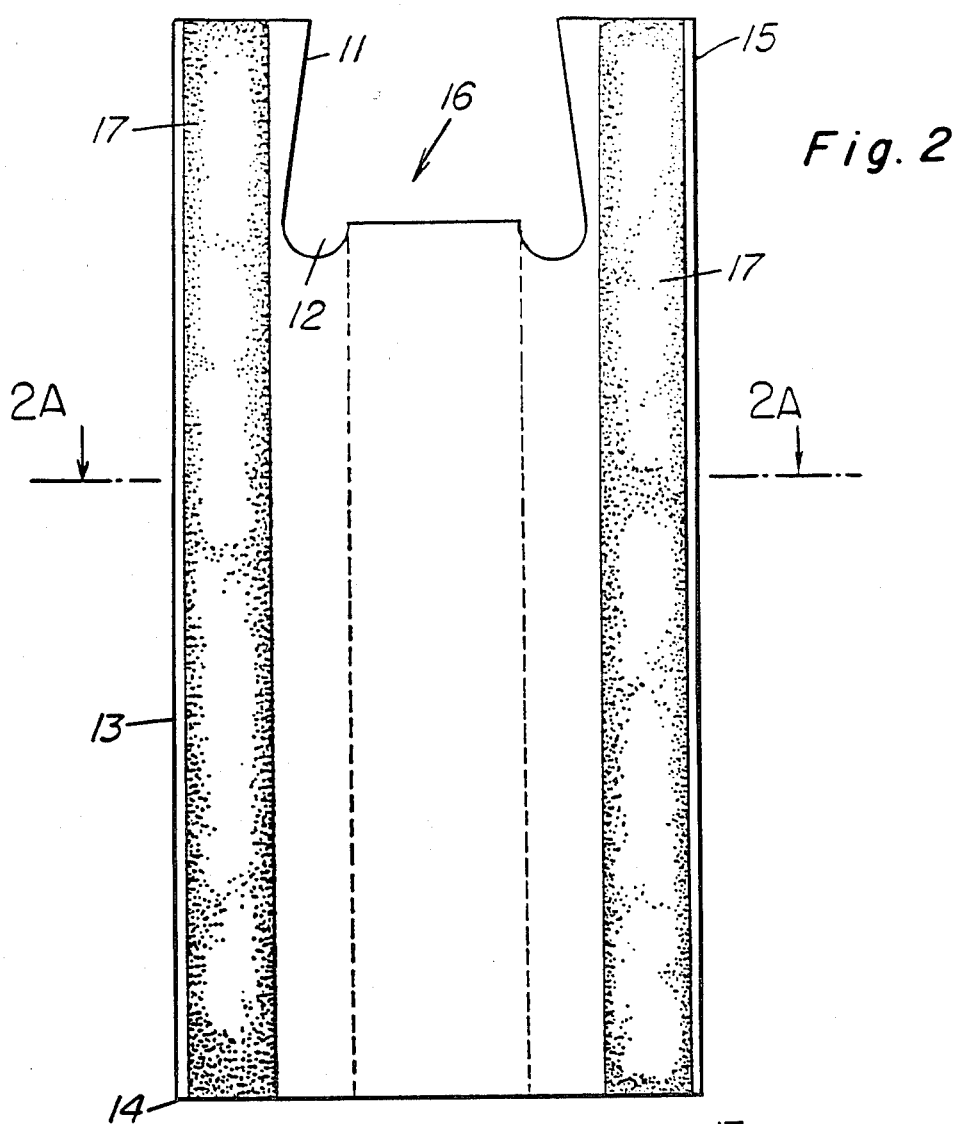
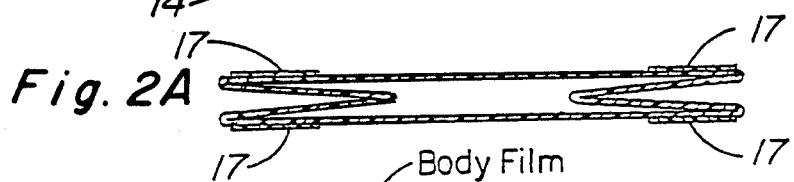
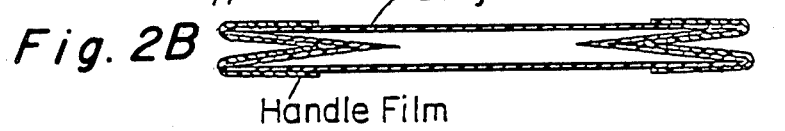
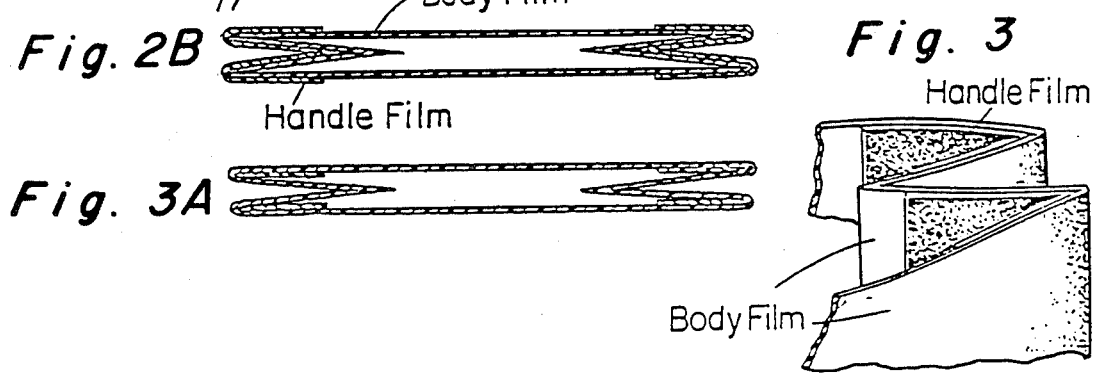

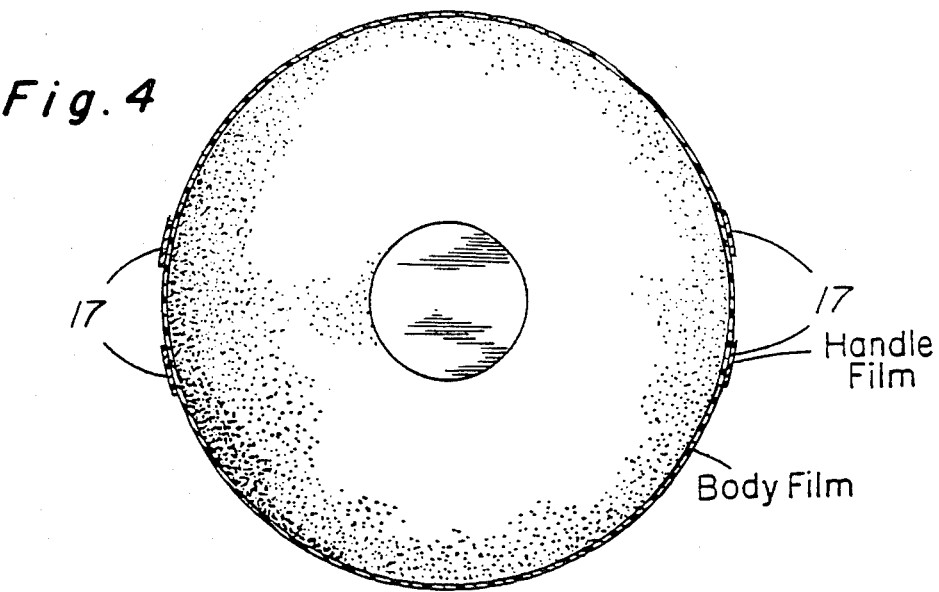
Fig. 4
17 — Handle Film
Body Film
Body Film
Handle Film
17
Segmented Lip
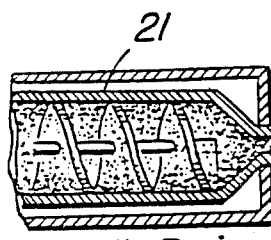
21
Handle Resin Extruder
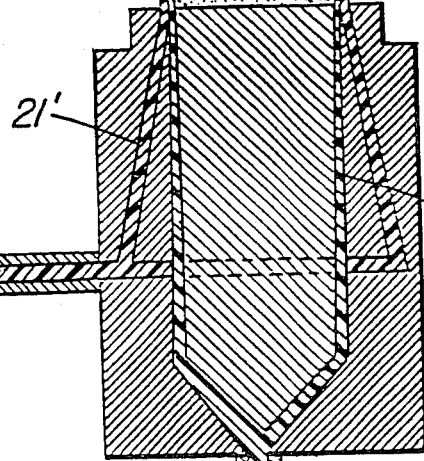
21'
22'
Fig. 5
Coextrusion Die
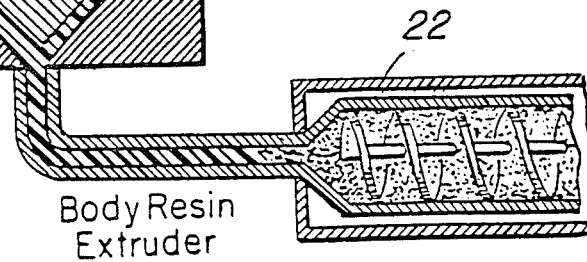
22
Body Resin Extruder

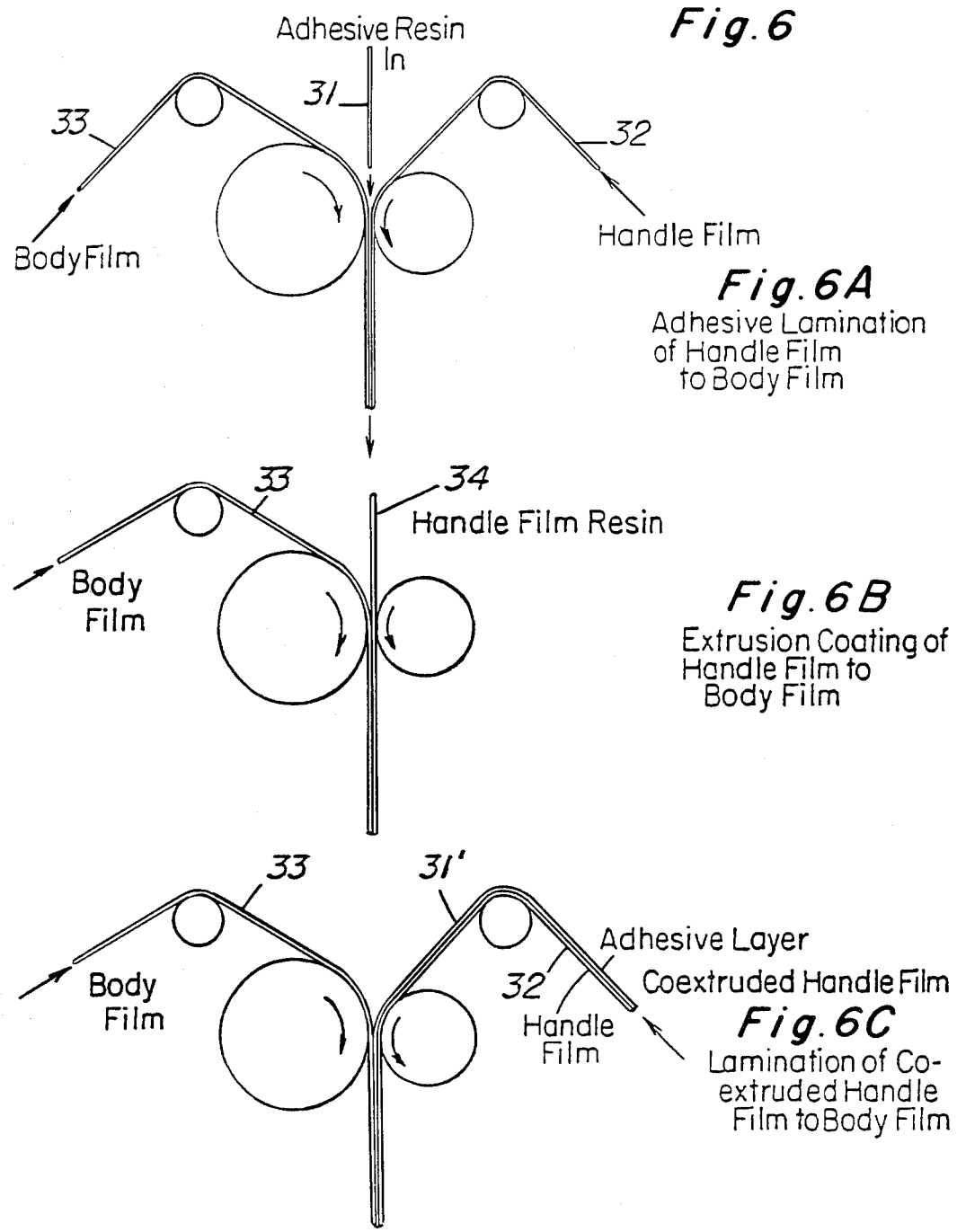

4,464,157

METHOD OF PREPARING A THERMOPLASTIC BAG HAVING REINFORCED HANDLES

CROSS REFERENCE TO RELATED APPLICATIONS

This application is a continuation application of U.S. application Ser. No. 308,759 filed Oct. 5, 1981, now abandoned which in turn is a divisional application of U.S. application Ser. No. 086,374 filed Oct. 18, 1979, which in turn is a continuation application of U.S. application Ser. No. 945,765 filed Sept. 25, 1978 (now abandoned).

BACKGROUND OF THE INVENTION

1. Field of the Invention

The present invention relates to thermoplastic bags which are provided with integral handle members on opposite sides of the bag mouth. The structure of the bag handles is especially designed to avoid failure in the handle area when such bags are in use by providing an additional thermoplastic layer at least in the handle area of such bags.

2. Description of the Prior Art

In the past, bags which were characterized by having carrying handles thereon were constructed using separate handle elements, distinct from the bag structure itself. Such handle elements were individually fed, during bag manufacture, for attachment adjacent to the open mouth portion of the bag. The manufacturing operation to produce such prior art structures with the separate process step of supplying handle elements, and applying them to the bag is quite cumbersome and uneconomical. More recently, however, bag structures have been developed, see for example, U.S. Pat. Nos. 4,085,822; 3,352,411; and 3,180,557; and Belgian Pat. No. 862,069, the disclosures of which are incorporated herein by reference, wherein bags are formed so that the handle carrying elements are formed as an integral part of the bag structure itself. That is, the handles are actually an extension of the bag walls. An example of such a bag structure is one that is constructed from a flattened tube or a flattened side edge gusseted tube which is sealed at both ends. A flattened end portion of such a tube is cut off to form an open mouth bag. Conversely, such a bag may be formed by folding a piece of the thermoplastic material on itself, the bottom fold line constituting the bottom part of the bag and heat sealing the upper edge and side wall parts of the bag together. Next a U shaped cutout is made in the upper portion of the bag to provide an opening or entrance, for the introduction of goods to be packaged. The opposite edtes of the upper portion of the bag structure immediately adjacent to the cutout area form loops which may be used to carry such bag structures when they are loaded. In the case of a gusseted tube such handle loops are reinforced, i.e., double ply thickness, by virtue of the presence of the re-entrant or gusset fold in the loop handle members.

Such afore-described prior art bag structures present difficulties for the end user particularly since, for reasons of economy, such structures are usually produced from extremely thin thermoplastic material, i.e., on the order of about 1.0 mil. or less. There is a tendency for such bags to fail in the handle area where, when the loaded bags are being carried, there is a tendency for the stress forces to concentrate. Prior art bag structures of the type hereinabove described are usually formed from low-density polyethylene material.

It has been found that the use of a mono-layer homogeneous composition for both the handle and the body portion of the hereinabove described bags requires necessarily that the resin and thickness choice fulfill the handle tensile strength requirements and body tear and puncture requirements simultaneously. Obviously, such an arrangement is not the most economical utilization of available resin materials. Generally speaking, a single specialty resin which would accomplish all three of these requirements when produced in the form of a relatively thin film structure would be economically prohibitive in the case of the manufacture of the present disposable bag structures.

In general, low density polyethylene has certain physical characteristics which make its employment as a body film desirable for the handle bag constructions of the present invention. In particular, such advantages include its low cost, high puncture resistance, and its resistance to splitting and tearing while under load stress. Conversely, however, as hereinabove noted, low density polyethylene exhibits unsatisfactorily low load bearing ability in the handle regions of such handle bag constructions. The relative low tensile yield properties of low density polyethylene account in part for this deficiency. Accordingly, it is an object of the present invention to improve such bag structures by increasing the tensile yield values in the handle regions of such bags when they are under load.

These and other objects of the present invention may be accomplished by laminating to the handle area of such bags, a film which is specifically designed to improve the overall tensile yield and strength characteristics of the bag in this area. Such film materials include fractional melt index low-density polyethylene, other thermoplastic materials such as linear low-density polyethylene, polypropylene, high-density polyethylene, and thermoplastic films which are highly oriented in the machine direction, including film materials which have been cold drawn, i.e., stretched at ambient temperatures. In addition to cold drawing techniques to achieve the requisite strength characteristics for the reinforcing handle film, such films may also be melted oriented during extrusion. In the case of high-density polyethylene, such melt orientation may be achieved during tubular extrusion thereof by employing low blow up ratios on the order of about 2:1. A range of such low blow up ratios which may be employed to achieve melt orientation of high density polyethylene encompasses from about 1:1 up to about 2.5:1. It has been found that the employment of oriented handle laminating materials in the bag handle area result in improvements in both tensile strength and the yield strength of the film.

SUMMARY OF THE INVENTION

In accordance with one aspect of the present invention, handled thermoplastic bag structures are formed wherein the individual handles of such bags are reinforced by the lamination in the handle areas of another relatively thin film layer which will impart the required tensile strength, tear resistance, and puncture resistance in combination with the bag proper which is necessary to insure the required structural integrity of such bag structures when they are under load stress.

In particular, specific embodiments of the bag structures of the present invention, the handle structures of the bag may be reinforced by laminating to the handles a second film layer. Such laminations may take the form of a coextruded lamination whereby multiple layers of film in the handle area are formed when the tubular thermoplastic film used to fabricate such bags is being extruded. Alternatively, such laminates may be formed utilizing an adhesive resin lamination whereby the reinforced handle film is applied to the preformed body film with an intermediate layer of adhesive resin to bond the film handle reinforcement layer to the body film. Alternate embodiments of such an adhesive laminate structure include employment of a molten resin adhesive which is extruded intermediate the body film and handle film; or by applying such reinforcing handle film to the body film by initially forming an adhesive layer on the handle film by a coextrusion or precoating technique, and subsequent adhesive lamination to the bag body on stock film ultimately intended to form the bag body.

BRIEF DESCRIPTION OF THE DRAWINGS

FIG. 2 is a side elevational view of the handle bag as shown in FIG. 1 wherein a reinforcing film is laminated to the opposite sides of the bag edges, including the handle areas.

FIG. 2A is a cross-sectional view of the bag structure as shown in FIG. 2 taken on line 2A—2A of FIG. 2.

FIG. 2B is an alternate cross-sectional embodiment showing reinforcing laminar film strips positioned exteriorly of the bag wall edges and continuously extending through the bag gusset area.

FIG. 3 is a fragmentary schematic view of a partially open bag showing reinforcing strips extending longitudinally, and interiorly, of the bag gusset and inside edges of the bag walls.

FIG. 3A is a cross-section, similar to FIG. 2A, with the reinforcing strips positioned interiorly of the bag wall edges.

FIG. 4 is a cross sectional view through an extruded film tube having coextrusions thereon of reinforcing material.

FIG. 5 is a schematic representation of an extrusion system which may be employed to coextrude the reinforced handle bag tubular stock material which is employed to produce the reinforced handle bags of the present invention.

FIGS. 6A, 6B and 6C are schematic representations of alternate methods for application of the reinforcing handle material on to the surface of the basic body film of the bag structures of the present invention, utilizing adhesives.

DESCRIPTION OF SPECIFIC EMBODIMENTS

Figure 1:
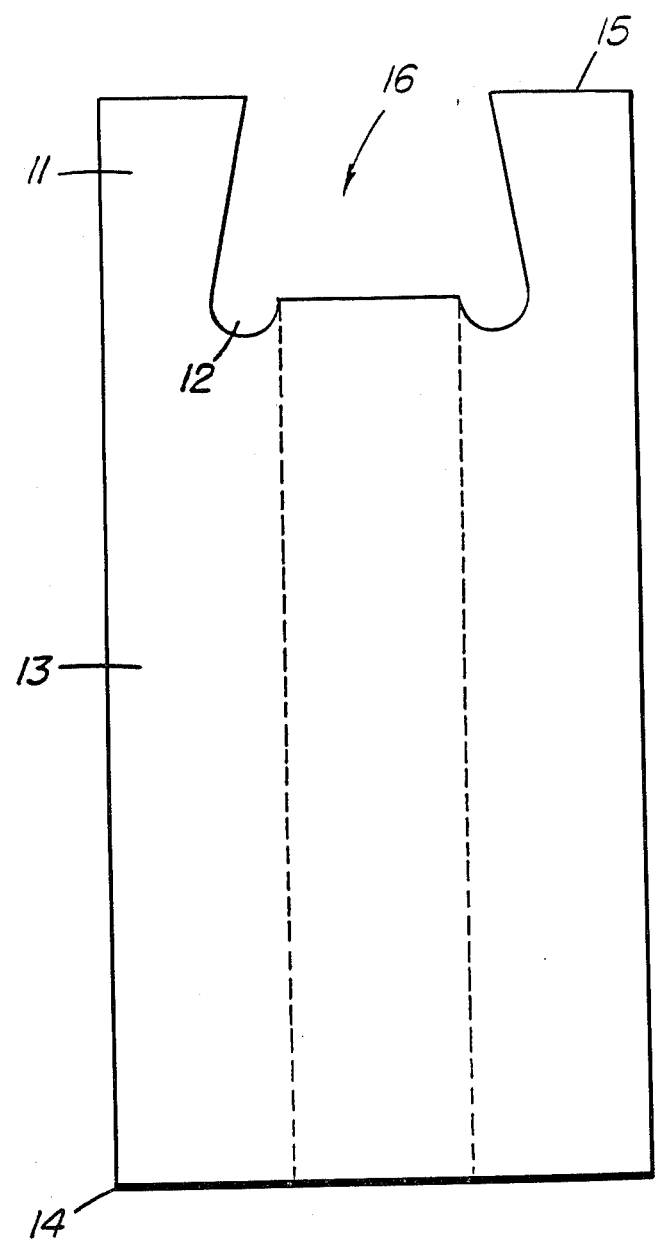
FIG. 1 is a schematic drawing of a particular handle bag configuration without the reinforcement provided in accordance with the present invention.

The bag structures of the present invention employ a design of handle body configurations which allows the uncoupling of the selection of a handle film from the selection of the film which constitutes the bag body proper. As shown in FIGS. 2, 2A, 2B and 3A, the reinforcing handle film may be applied to the bag body utilizing a wide variety of reinforcing film locations. As shown in FIGS. 2 and 2A, the reinforcing film may be positioned on the exterior walls of the bag along the opposite edges thereof and not only occupy the handle regions but also be continuous along the side edge of the bag wall. Alternatively, as shown in FIGS. 2B and 3A, such reinforcing film may be positioned interiorly of the side gussets in the bag structure or, in the event additional strength is needed in the bag handle area, the reinforcing film strips may be positioned both interiorly and exteriorly of the side wall gussets.

As will be apparent from FIG. 1, a preferred basic form of the bag structure which may be improved and strengthened by practice of the present invention, generally comprises a bag fabricated from a gusseted, flattened thermoplastic tube. Such bags comprise integral upper handle numbers 11 which are heat sealed along their upper edges at 15. The bag bottom portion is also sealed along the area designated as 14. The opposite side edges of the bag structure are characterized by having inwardly folded gusset pleats 13, which allow for bag expansion when such bags are being loaded, and, provide a double ply thickness to assist in reinforcement and strengthening of bag handle members 11. Also as shown in FIG. 1, the upper portion of the bag structure is cut away at 16 to form a bag mouth opening.

In accordance with certain specific aspects of the present invention there are a number of fabrication techniques which may be employed to produce the reinforced, laminar handle bag structure. One of these methods is depicted schematically in FIG. 5. As shown in FIG. 5, two separate conventional rotating screw extruder apparatus are employed to feed molten polymer streams 21' and 22', respectively, to a coextrusion tubular die apparatus. Extruder 21 supplies molten polymer stream 21 to the die to form the reinforced film portions of tube 26 in those areas of tube 26 which will eventually correspond to the handle portion of the bag structures fabricated from tube 26. Extruder 22 is employed to feed to the die, in the form of molten stream 22', molten polymer which is eventually formed into that portion of tube 26 which will form the bag body proper, i.e., a basic bag body structure as shown in FIG. 1.

As shown in FIG. 6A another alternative embodiment for the fabrication of the laminated handle bags of the present invention comprises the employment of a molten adhesive resin 31. Body film 33 and reinforcing handle film 32 are continuously fed from separate supply sources into the nip of a pair of counter-rotating rollers. A continuous stream of adhesive resin 31 is simultaneously fed into the nip intermittent body film 33 and handle film 32, whereby the laminate emerging from the nip comprises body film 33 adhesively secured by adhesive 31 to handle film 32.

FIG. 6A illustrates a coextrusion technique unlike the coextrusion system shown in FIG. 3, whereby rather than coextruding the film layers simultaneously through a single die orifice as shown in FIG. 3, molten handle film resin 34 is continuously fed onto the surface of body film 33 and into the nip formed by a pair of counter rotating rollers. In this embodiment, no adhesive is required and the laminate which emerges from the nip of the counter-rotating rollers comprises the bag body film having located thereon, at spaced apart locations, the reinforcing handle film layers.

A still further fabrication embodiment which may be employed in the manufacture of the bag structure of the present invention is illustrated in FIG. 6C. As shown, adhesive layer 31' has already been preformed onto the surface of the handle layer film 32. The adhesive coated handle film 32 is passed between the nip of a pair of counter rotating rollers and pressed against body film 33 simultaneously being fed into the same nip. The construction of the resultant laminate is essentially the same as the laminar stock material formed as shown in FIG. 4a. Although not shown in the drawings, the tubular stock material which is formed in accordance with the procedures illustrated in FIGS. 5, 6A, 6B and 6C is subsequently forwarded to a bag forming station whereat the flattened tubular stock is cut-off and heat sealed at longitudinally spaced apart locations. Next, a substantially "U" shaped cut-out is formed at one end of the tube to simultaneously produce the open mouth and handle portions of such bags. These bag making techniques are well known and are disclosed in the prior art hereinabove discussed.

In accordance with certain specific aspects of the present invention there are a number of production techniques which may be employed to produce the present reinforced laminar bag handles. One such method is depicted schematically in FIG. 5. As shown in FIG. 5, two separate conventional rotating screw extruder apparatus are employed to feed molten polymer streams 21' and 22', respectively, to a coextrusion tubular die apparatus 23. Extruder 21 supplies molten polymer stream 21 to the die to form the reinforced film laminate of tube 26 in those areas of tube 26 which will eventually correspond to the handle portion of the bag structures which are fabricated from tube 26. Extruder 22 is employed to feed the die with molten resinous stream which is eventually formed into that portion of tube 26 which will form the bag body proper, i.e. a basic bag body structure as shown in FIG. 1.

EXAMPLE 1

In the present Example a pair of rotating screw thermoplastic extruders continuously feed polyethylene molten resin to a tubular coextrusion die wherein the molten resins were joined together to produce a coextruded tube as shown in FIG. 5. The thermoplastic extrudate tube was characterized by having a continuous body film 24 and, spaced in 4 longitudinally extending strips around the circumference of the body film tube, were the coextruded laminated layers of the handle film. The specific polyethylene resins used in the present Example are described below in Table I.

TABLE I

|  | Body Film | Handle Film |
|---|---|---|
| Melt Index (gms/10 min) | 2.0 | .25 |
| Density | .921 | .923 |
| Md *Yield (psi) | 1505 | 1590 |
| MD Ultimate (psi) | 2271 | 2780 |
| MD Elongation (%) | 500 | 450 |

*Machine Direction

Thermoplastic extruder 22 employed for the extrusion of the body film had a 24:1 length to diameter ratio, 3.5 inch extruder screw. Extruder 22 had an output of about 1.5 lbs per hour a resin feed mixture comprising 8% low density polyethylene pigment concentrate and 92% low density polyethylene body resin which was extruded at a melt temperature of 420° F. The handle film extruder 21 had a 24:1 length to diameter ratio, 1.5 inch diameter screw which was supplied at the rate of 39 lbs per hour. The handle film feed was a mixture of about 8% by weight of pigment polyethylene resin and 92% by weight of handle polyethylene resin described hereinabove. The extrusion temperature of the molten handle polyethylene melt was about 430° F. Within the confines of the coextrusion die the individual molten streams of handle resin and body resin are joined while in a molten state and in the absence of adhesives whereby the molten layers upon exiting from the die are in intimate contact and firmly welded together. A tubular blowup ratio of about 1:2.12 was employed and the die diameter orifice was about 6 inches. The line running speed was about 120 linear feet per minute. The total average thickness of the coextruded structure was about 1.5 mils.

The coextruded film as hereinabove described was subsequently converted to the handle bag structure shown in FIGS. 2 and 2A. The bag structure of Example 1 had the following properties as shown in Table II wherein it is compared to the strength characteristics of a low density polyethylene monolayer film bag as illustrated in FIG. 1.

TABLE II

|  | Example 1 Bag | Monolayer Film Bag |
|---|---|---|
| Aver. bag gauge | 1.5 | 2.00 |
| Handle: Strength |  |  |
| Yield Strength (lb) | 29.7 | 24.1 |
| Ultimate Strength (lb) | 48.1 | 36.3 |

EXAMPLE 2

As shown in FIG. 6C a coextrusion lamination comprising handle film 32 fabricated from a high density polyethylene resin and adhesive layer 31' were joined together with body film 33 by passing the respective structures into the nip formd by a pair of counterrotating rollers. Body film 33 was ungusseted lay flat tubular film at the time of lamination. The handle film 32 with the adhesive layer 31' thereon was in the form of narrow strips approximately 2 inches wide. Adhesive layer 31' was a thermoplastic laminating adhesive commercially available from its manufacturer, Polymer Industries, and identified as LAMAL HSA, a 2 part urethane prepolymer adhesive. The 2 inch wide strips of adhesive coated handle film 32 were laminated to body film 33 by the nip rollers at a rate of about 100 feet per minute. The physical properties of the polyethylene resins used to produce the bag structure of this Example are set forth hereinbelow in Table III.

TABLE III

|  | Body Film | Handle Film |
|---|---|---|
| M.I. | 2.6 | .08 |
| Density (gm/cc) | .926 | .955 |
| MD Yield (psi) | 1405 | 4200 |
| MD Ultimate (psi) | 4300 | 10841 |
| MD Elongation (%) | 820 | 328 |
| Elmendorf Tear resistance |  |  |
| MD (gm) | 432 | 15 |
| TD (gm) | 584 | 600 |

The operating conditions for the production of the respective body film 33 and handle film 31' are set forth hereinbelow in Table IV.

TABLE IV

|  | Body Film | Handle Film |
|---|---|---|
| Film gauge (mils | .90 | 1.0 |
| Extruder size (")/L/D | 3½"/24:1 | 3½"/24:1 |
| Resin composition |  |  |
| body resin | 92% | 92% |
| pigment concentration | 8% | 8% |
| Die size (inches) | 8 | 3 |
| Extrusion rate lbs/hr. | 160 | 120 |
| Melt Temp. (°F.) | 420 | 460 |
| Film layflat (inches) | 20 | 20 |
| Blow Up Ratio | 1.6 | 4.2 |

TABLE IV-continued

|  | Body Film | Handle Film |
| --- | --- | --- |
| Line Speed (ft/min) | 170 | 120 |

The resultant laminated film structure when converted into a handle bag construction, exhibited the following film properties as compared to a thicker monolayer bag, typical of the prior art:

TABLE V

|  | Example 2 Bag | Monolayer Film Bag |
| --- | --- | --- |
| Aver. film gauge | 1.0 | 1.75 |
| Handle Strength |  |  |
| Yield strength (lbs) | 58 | 24.1 |
| Ultimate (lbs) | 149 | 36.3 |
| Film Elmendorf (gms) |  |  |
| MD | 432 | 75 |
| TD | 584 | 400 |

It can be seen from the physical properties of the reinforced handle bag structures of the present invention and as set forth in the preceeding Examples 1 and 2 such bags exhibit far superior strength characteristics under load carrying stresses than the single layer film structure bags of the prior art.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method of forming a gusseted thermoplastic bag, comprising the steps of:
   coextruding a tube of at least two thermoplastic resins, one of said extruded resins forming a continuous tube body and the other of said extruded resins forming a plurality of reinforcement strips extending longitudinally along at least a portion of said continuous tube body;
   forming said coextruded tube into a plurality of separated, flattened, side edge gusseted tubes which are sealed at both ends, said side edge gusseted tubes being formed such that said reinforcement strips extend longitudinally of at least a portion thereof and such that at least two reinforcement strips overlap one another at areas adjacent each of opposite side edges of said gusseted tubes; and
   removing a cut-out from a flattened portion at one end of each of said gusseted tubes and between the overlapping reinforcement strips located at said areas adjacent the opposite side edges of said gusseted tubes to provide an open mouth portion having handle loops adjacent thereto and at opposite sides thereof, at least a part of each of said handle loops being reinforced with said reinforcement strips.

2. A method as in claim 1, wherein said coextruded resins are different polymer compositions.

3. A method as in claim 2, wherein the extruded resin forming said reinforcement strips has a relatively higher tensile strength than the extruded resin forming said continuous tube.

4. A method as in claim 1, wherein said reinforcement strips extend from one end of said gusseted tubes to the other.

5. A method as in claim 4, wherein said reinforcement strips are provided on the outside of said gusseted tubes.

6. A method as in claim 4, wherein said reinforcement strips are provided on the inside of said gusseted tubes.

7. A method as in claim 4, wherein said reinforcement strips are provided on the inside and outside of said gusseted tubes.

8. A method as in claim 5, wherein said reinforcement strips are provided within the side edge gusset of said gusseted tubes.

9. A method as in claim 3, wherein the relatively lower tensile strength film comprises a lower density polyethylene composition and the relatively higher tensile strength composition is a member selected from the group consisting of low density polyethylene, linear low density polyethylene, polypropylene and high density polyethylene.

* * * * *